(12) United States Patent
Young et al.

(10) Patent No.: US 7,899,670 B1
(45) Date of Patent: Mar. 1, 2011

(54) SERVER-BASED SPEECH RECOGNITION

(75) Inventors: Jonathan Hood Young, Newton, MA (US); Roger S. Zimmerman, Wellesley, MA (US)

(73) Assignee: eScription Inc., Needham, MA (US)

( * ) Notice: Subject to any disclaimer, the term of this patent is extended or adjusted under 35 U.S.C. 154(b) by 997 days.

(21) Appl. No.: 11/614,898

(22) Filed: Dec. 21, 2006

(51) Int. Cl.
*G10L 15/26* (2006.01)

(52) U.S. Cl. .................. 704/235; 704/270.1; 704/275; 704/257; 704/246; 715/255; 709/250; 709/218; 379/75

(58) Field of Classification Search ................ 704/235, 704/270.1, 270, 275, 246, 231, 257, 233, 704/251, 250, 278; 715/255; 709/250, 218; 369/25.01; 379/75
See application file for complete search history.

(56) References Cited

U.S. PATENT DOCUMENTS

| | | | |
|---|---|---|---|
| 5,146,439 A | 9/1992 | Jachmann et al. | 369/25 |
| 5,519,808 A | 5/1996 | Benton, Jr. et al. | 395/2.79 |
| 5,602,982 A | 2/1997 | Judd et al. | 395/326 |
| 5,748,888 A | 5/1998 | Angelo et al. | 395/186 |
| 5,812,882 A | 9/1998 | Raji et al. | 395/892 |
| 5,857,212 A | 1/1999 | Van De Vanter | 707/519 |
| 5,875,448 A | 2/1999 | Boys et al. | 707/531 |
| 6,122,614 A * | 9/2000 | Kahn et al. | 704/235 |
| 6,173,259 B1 * | 1/2001 | Bijl et al. | 704/235 |
| 6,366,882 B1 * | 4/2002 | Bijl et al. | 704/235 |
| 6,374,225 B1 | 4/2002 | Hejna, Jr. | 704/270 |
| 6,415,256 B1 | 7/2002 | Ditzik | 704/231 |
| 6,438,545 B1 | 8/2002 | Beauregard et al. | 707/6 |
| 6,490,558 B1 * | 12/2002 | Kahn et al. | 704/235 |
| 6,865,258 B1 | 3/2005 | Polcyn | 379/88.01 |
| 6,950,994 B2 | 9/2005 | Dharap | 715/864 |
| 6,961,699 B1 | 11/2005 | Kahn et al. | 704/235 |
| 6,996,445 B1 | 2/2006 | Kamijo | 700/94 |
| 7,006,967 B1 * | 2/2006 | Kahn et al. | 704/235 |
| 7,016,844 B2 | 3/2006 | Othmer et al. | 704/270.1 |
| 7,236,932 B1 | 6/2007 | Grajski | 704/277 |
| 7,516,070 B2 * | 4/2009 | Kahn | 704/235 |
| 2003/0046080 A1 | 3/2003 | Hejna, Jr. | 704/270 |
| 2003/0067495 A1 | 4/2003 | Pu et al. | 345/811 |
| 2003/0225578 A1 * | 12/2003 | Kahn et al. | 704/243 |
| 2005/0149747 A1 | 7/2005 | Wesinger et al. | 713/200 |
| 2006/0149558 A1 * | 7/2006 | Kahn et al. | 704/278 |
| 2006/0206943 A1 | 9/2006 | Ellison et al. | 726/26 |
| 2006/0253895 A1 | 11/2006 | Brandofino et al. | 726/2 |
| 2006/0272025 A1 | 11/2006 | Mononen | 726/26 |
| 2007/0106508 A1 * | 5/2007 | Kahn et al. | 704/235 |
| 2007/0143857 A1 | 6/2007 | Ansari | 726/26 |

(Continued)

OTHER PUBLICATIONS

Batty et al., "The development of a portable real-time display of voice source characteristics", *IEEE*, 2:419-422 (2000).

*Primary Examiner* — Vijay B Chawan
(74) *Attorney, Agent, or Firm* — Wolf, Greenfield & Sacks, P.C.

(57) ABSTRACT

A computer program product for transcribing a medical dictation in real-time includes instructions for causing a computer to obtain a user identification from a user at a client via a computer network, the user identification being associated with medical personnel that provides a dictation concerning a patient, load models associated with the user identification, the models being configured to assist in developing a draft transcription of the dictation, receive an audio feed of the dictation from the client, process the audio feed using the models to create a segment of the draft transcription of the dictation, and transmit the segment of the draft transcription to the client.

14 Claims, 9 Drawing Sheets

U.S. PATENT DOCUMENTS

| | | | |
|---|---|---|---|
| 2007/0244700 A1* | 10/2007 | Kahn et al. | 704/235 |
| 2007/0244702 A1* | 10/2007 | Kahn et al. | 704/260 |
| 2007/0283444 A1 | 12/2007 | Jang | 726/26 |
| 2007/0294745 A1 | 12/2007 | Tan et al. | 726/2 |
| 2007/0300287 A1 | 12/2007 | Wynne et al. | 726/2 |
| 2008/0059173 A1* | 3/2008 | Gilbert et al. | 704/235 |
| 2008/0059197 A1* | 3/2008 | Jones et al. | 704/270.1 |

* cited by examiner

| User Table | 52 | 54 | 56 |
|---|---|---|---|
| | User ID1 | Models Filepointer 1 | Background ASR Models Filepointer 1 |
| | User ID2 | Models Filepointer 2 | Background ASR Models Filepointer 2 |
| | 53 ⋮ | 55 ⋮ | 57 ⋮ |
| | User IDn | Models Filepointer n | Background ASR Models Filepointer n |

FIG. 3A

| Client Workstation Table 72 | 74 |
|---|---|
| Client ID1 | IP Address 1 |
| Client ID2 | IP Address 2 |
| 73 ⋮ | 75 ⋮ |
| Client IDn | IP Address n |

FIG. 3B

| ASR Device Table 92 | 94 |
|---|---|
| ASR ID1 | IP Address 1 |
| ASR ID2 | IP Address 2 |
| 93 ⋮ | 95 ⋮ |
| ASR IDn | IP Address n |

SERVER-BASED SPEECH RECOGNITION

BACKGROUND OF THE INVENTION

In an application of background speech recognition to medical transcription, the automatic speech recognition ("ASR") process is run "off line", without real-time clinician interaction. The speaker dictates a report normally, the audio is stored on a fileserver and the speech recognition process is run on the audio file in batch mode at a later time. Draft transcriptions produced by the ASR process may then be edited by the clinician or by a Medical Transcriptionist ("MT") before being added to the medical record. An example of this type of ASR application is the EditScript product from eScription.

In healthcare applications, background speech recognition has particular advantages. For example, the clinician need not significantly change their workflow relative to how they normally dictate. Medical transcriptionists can edit the draft documents much faster than they can type them, and with greater facility than a clinician can edit. Further, since ASR computation is not restricted to the environment of the healthcare facility, extensive computational resources may be brought to bear on the difficult problem of speech recognition. Also because the ASR resources are off-site, clinicians can dictate at any time or place, unrestricted by the availability of a particular workstation.

Although background speech recognition has many benefits, in some health care applications, other considerations can become significant that make background speech recognition less beneficial. For example, an Emergency Department may require rapid turnaround time for dictated Radiology reports. In some circumstances, it may be a requirement that documents are signed immediately after dictation. Thus, many healthcare organizations opt for deployment of real-time ASR systems, which negates some of the aforementioned advantages of background ASR.

SUMMARY OF THE INVENTION

Embodiments of the invention are directed to an architecture for performing real-time automatic speech recognition ("ASR") using centralized ASR servers.

In general, in an aspect, the invention provides a computer program product for transcribing a medical dictation in real-time, the computer program product residing on a computer-readable medium and including computer-readable instructions for causing a computer to: obtain a user identification from a client via a computer network, the user identification being associated with and indicative of a speaker that provides the medical dictation concerning a patient; load models associated with the user identification, the models being configured for use in recognizing words in the medical dictation to develop a draft transcription of the dictation; receive an audio feed of the dictation from the client; process the audio feed using the models in real-time to create a segment of the draft transcription of the dictation; and transmit the segment of the draft transcription to the client.

Implementations of the invention may include one or more of the following features. The computer program product further includes instructions for causing the computer to establish a connection with the client based on an availability of the computer to process the audio feed from the client. The instructions for causing the computer to process the audio feed to create the draft transcription of the dictation are configured to cause the computer to: create the draft transcription of a completed dictation; and transmit the draft transcription of the completed dictation to the client. The instructions for causing the computer to transmit the segment of the draft transcription to the client are configured to cause the computer to transmit the segment of the draft transcription for real-time review at the client. The computer program product further includes instructions for causing the computer to store the segment of the draft transcription in association with the audio feed. The computer program product further includes instructions for causing the computer to store the entire draft transcription in association with the audio feed. The computer program product further includes instructions for causing the computer to: complete the process of creating the segment of the draft transcription; determine presence of a second segment of the audio feed of the dictation from the client; process the second segment of the audio feed using the models to create a second segment of the draft transcription of the dictation; and transmit the second segment of the draft transcription to the client. The computer program product further includes instructions for causing the computer to receive a sign-out signal from the client upon completion of the dictation.

In general, in another aspect, the invention provides a method of processing a medical record transcription, the method including obtaining a user identification from a client via a computer network, the user identification being associated with medical personnel that provides a dictation concerning a patient; loading models associated with the user identification, the models being configured to assist in developing a draft transcription of the dictation; receiving an audio feed of the dictation from the client; processing the audio feed using the models to create the draft transcription of the dictation; and transmitting the draft transcription to the client.

Implementations of the invention may include one or more of the following features. The method further includes establishing a connection with the client based on a client identification. The processing further includes processing a segment of the audio feed to create a draft transcription of the segment of the audio feed. The transmitting further includes transmitting a segment of the draft transcription to the client. The method further includes: refining the draft transcription sent to the client; and transmitting the refined draft transcription to the client.

In general, in another aspect, the invention provides a method of allocating a medical dictation to a server for translation, the method including: receiving an identification from a client via a computer network for processing a medical dictation over a network; selecting an available processor from multiple processors in communication over the network; sending an identification associated with the available processor to the client; and establishing a link between the client and the available processor such that data is transmitted from the client to the available processor for processing the medical dictation to create a draft transcription of the dictation in real-time.

Various aspects of the invention may provide one or more of the following capabilities. The architecture uses centrally maintained ASR servers and allows efficient clinician-controlled document turnaround. The system allows for immediate feedback to clinicians as to the quality of their draft. The speaker may see the draft as it is dictated and choose to send it off to background speech recognition. Computers with fast processors, large amounts of RAM and disk storage, and multiple-pass processing can be employed to improve the accuracy of draft transcriptions. Clinicians are unrestricted by the availability of a particular workstation. Additional computational resources may be efficiently shared among multiple clinicians at a health care organization and across multiple healthcare facilities. Batch processing can allow the dictated audio to be stored until computational resources are available. Health care organizations can reduce their cost of maintaining computational infrastructure. The ASR computer resources can be "hosted" off-site. Time and cost of generating medical transcription documents can be reduced. Clinicians may not be required to change their workflow relative to the manner in which they typically dictate. Medical transcriptionists can edit draft documents more efficiently.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide an architecture for performing real-time automatic speech recognition ("ASR") using centralized ASR servers. Embodiments of the invention provide centralized ASR servers that allow for rapid, clinician-controlled document turnaround. In embodiments of the invention, the system can provide substantially immediate feedback to clinicians about the quality of their draft. Other embodiments are within the scope of the invention.

Figure 1:
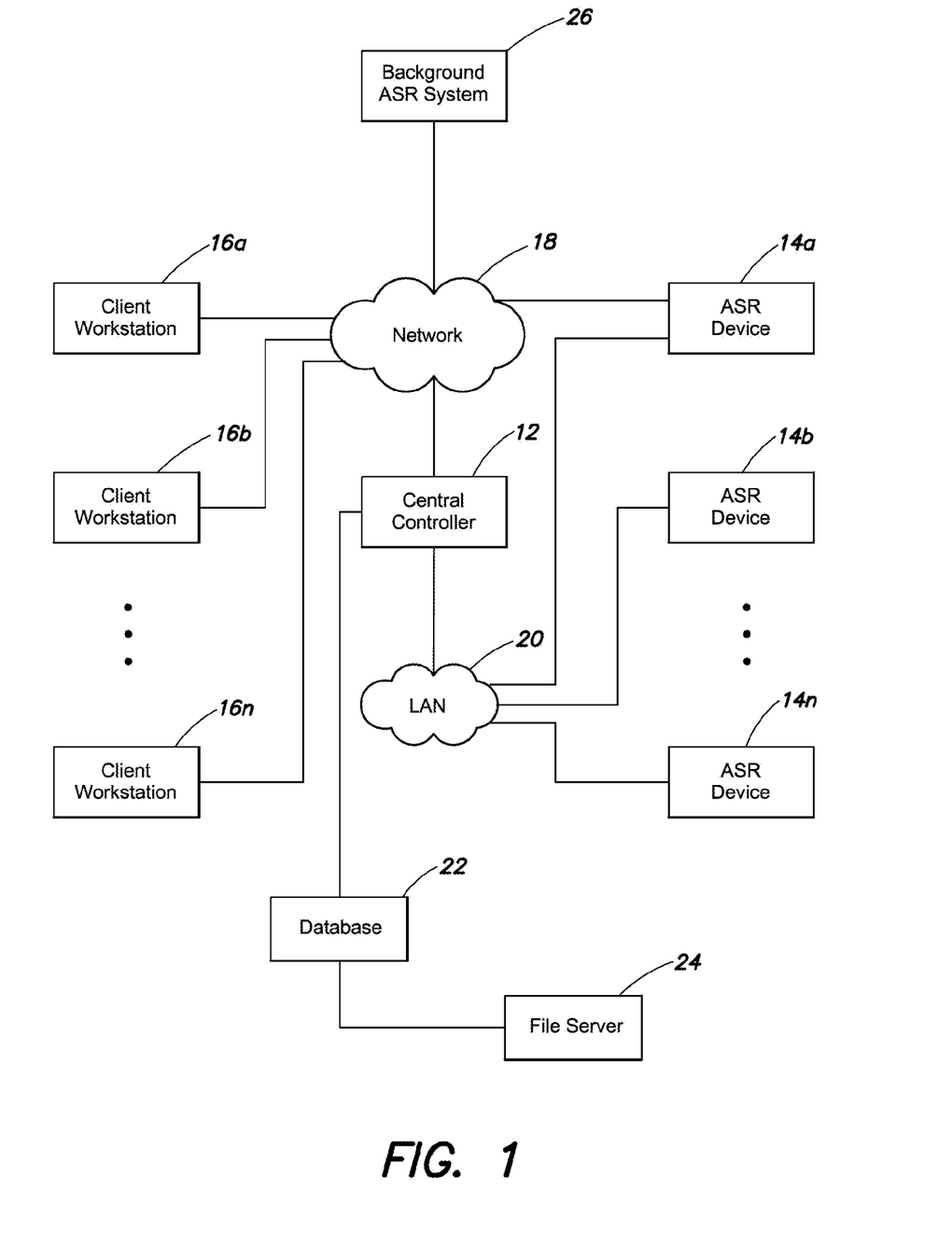
FIG. 1 is a simplified diagram of a system for transcribing dictations and editing corresponding transcriptions.

Referring to FIG. 1, a system 10 for performing real-time ASR includes a central controller 12, a real-time ASR device 14, a client workstation 16, a communications network 18, a communications network 20 and a database server 22 having a file server 24. Embodiments of the invention may have systems with more or fewer elements than the system 10, e.g., with two or more ASR devices 14 (as shown, 14a-14n) and two or more client workstations 16 (as shown, 16a-16n). The network 20 can further be connected to a background ASR system 26. Here, the network 18 is preferably a packet-switched network such as the global packet-switched network known as the Internet. The network 18 can alternatively be any communications network, such as a wide area network (WAN), ethernet, etc. The network 20 is preferably a packet-switched, local area network (LAN). Other types of networks may be used, however, for the networks 18, 20 or any or all of the networks 18, 20 may be eliminated, e.g., if items shown in FIG. 1 are combined or eliminated.

Each of the client workstation 16, the central controller 12, the database 22 and the ASR device 14 are connected over the network 18 and/or the network 20. Thus, the client workstation 16 can communicate with the central controller 12, the database 22 and the ASR device 14 to transmit and/or receive data. The client workstation 16 can also connect to the background ASR system 26 over the network 20. Dictation at the client workstation 16 is streamed to other locations via the network 18 and/or network 20, as described below.

Figure 2:
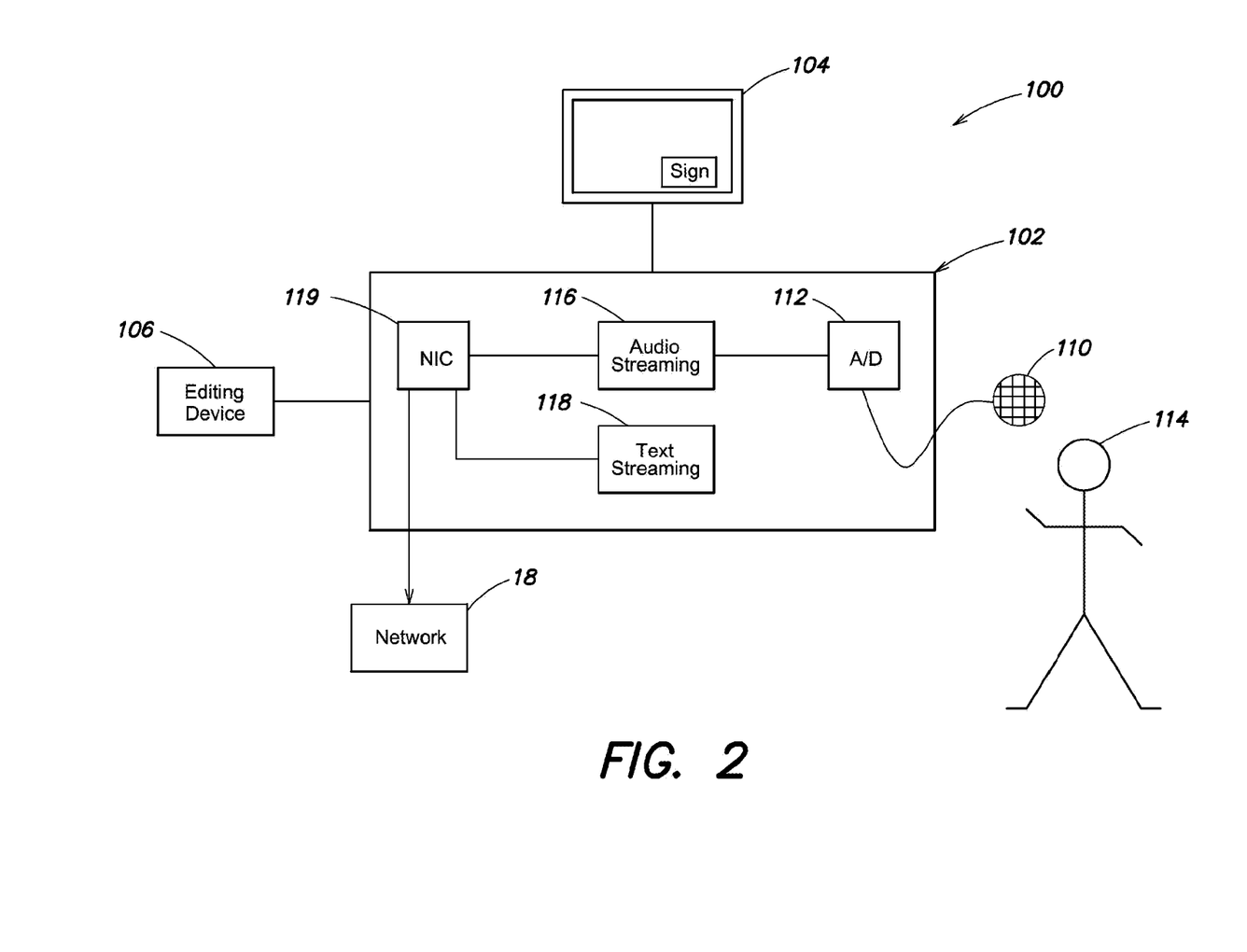
FIG. 2 is an exemplary user interface for editing transcription documents.

Referring also to FIG. 2, each client workstation 16 communicates over the network 18 with the central controller 12, at least one ASR device 14 and the database 22. The client workstation includes a dictation station 100 having a dictating device 102, a display monitor 104 and an editing device 106. The dictating device 102 includes an acoustic transducer 110 (e.g., a microphone), an A/D converter 112, an audio streaming file 116, a text streaming file 118 and a network connection 119. The microphone 110 is connected to the analog-to-digital ("A/D") converter 112. The A/D converter 112 is configured to digitize audio from the speaker 114 to produce a digital audio file 116 of the dictation. The dictating device 102 also receives a text stream 118 that appears on the monitor 104. Each of the audio streaming file 116 and the text streaming file 118 communicates via a connection over the network 18. The editing device 106 is configured to allow a client speaker 114 to edit and sign a document appearing on the display monitor 104. For example, the editing device 106 can be a text editor with a "sign" button to indicate clinician approval of an edited document. The editing device 106 may include a keyboard or other interactive mechanism by which the speaker/clinician 114 edits the text document on the monitor 104.

Preferably, the speaker 114 at the client workstation 16 dictates into a microphone 110 attached to a personal computer or other device. The speaker 114 may, however, use means other than the microphone 110 for creating the digital audio file 116 for each dictation. For example, the speaker 114 may dictate into a handheld PDA device that includes its own digitization mechanism for storing the audio file 116. Still other devices may be used by the speaker 114 for dictating, and possibly digitizing the dictation, and sending it over the network 18.

The dictating device 102 is configured to prompt the speaker 114 to enter an identification code. The speaker 114 can enter the codes, e.g., by speaking the codes into the microphone 110 or by using a keyboard at the dictation station 100, or with the microphone or other handheld device. The editing device 106 is configured to store the identifying code in association with the dictation. The identification code can associate the dictation with a particular speaker 114 and/or an entity associated with the speaker 114 (e.g., the speaker's employer or affiliate hospital, etc.). Speakers 114 with multiple affiliations (e.g., to different entities such as hospitals) preferably have multiple identification codes, with each identification code corresponding to a respective one of the affiliated entities.

The client workstation 16 is configured to transmit the digital audio file 116 and speaker identification code over the network 18 to the ASR device 14 for storage. This transmission is accomplished by the system 10 product using standard network transmission protocols communicating with the ASR device 14. The network 18 is also configured to convey a digital audio file from the client workstation 16 to the ASR device 14.

Figure 3A:
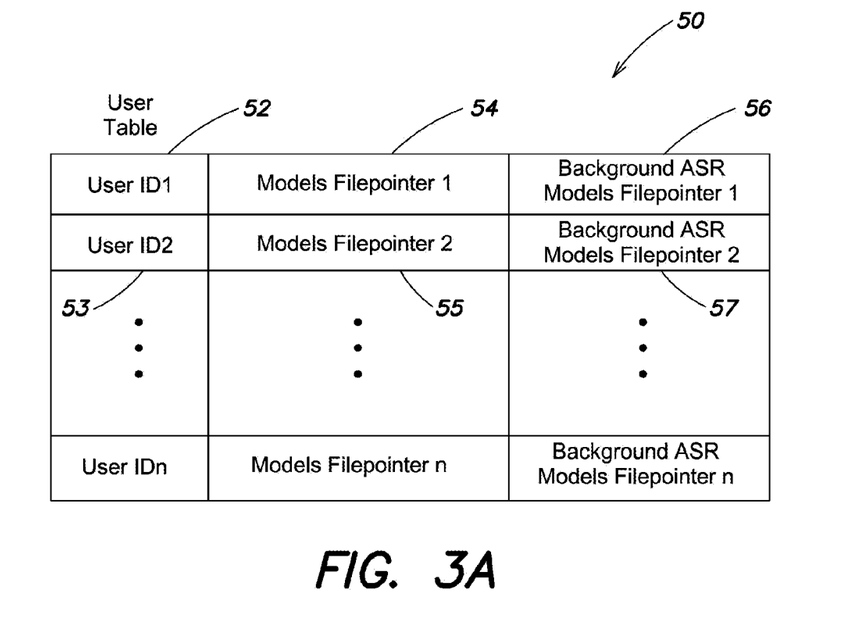
FIG. 3A is a simplified database user table.
Figure 3B:
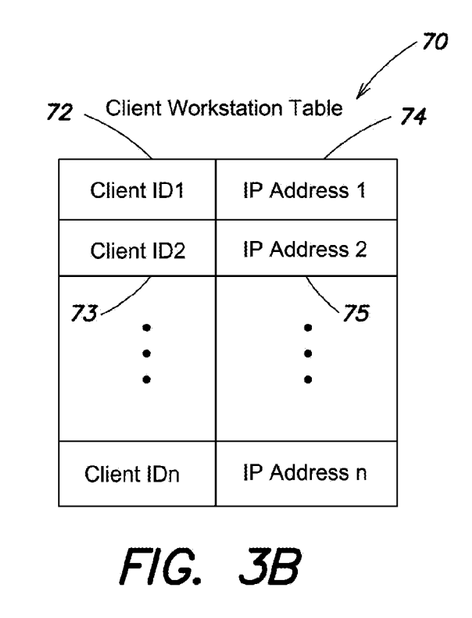
FIG. 3B is a simplified client workstation table.
Figure 3C:
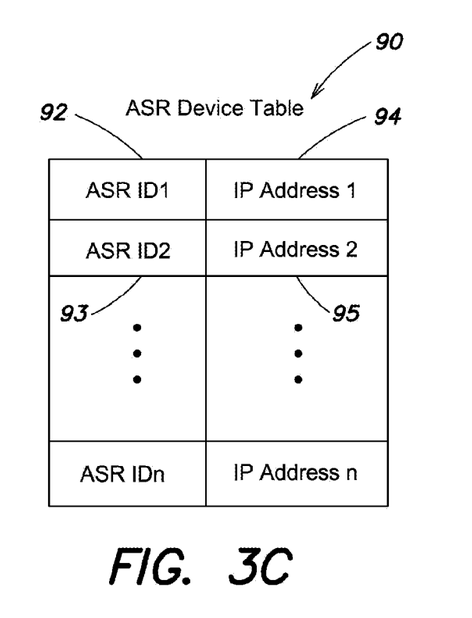
FIG. 3C is a simplified ASR device table.

The database 22 is configured to store the incoming data from the dictation system 100, as well as from other sources. The database 22 is configured to store information related to the speakers 114, client workstations 16 and ASR devices 14 from the central controller 12. Referring also to FIGS. 3A, 3B and 3C, the database 22 is configured to contain a user table 50, a client workstation table 70 and an ASR device table 90. The user table 50 contains a user ID field 52 containing user IDs 53, a models file pointer field 54 containing model file pointers 55, and a background ASR models file pointer field 56 containing background ASR models file pointers 57. Each of the models file pointers 54 and the background ASR file pointers 56 correspond to a user ID 53. Thus, each speaker is associated with particular ASR models 55, 57 in the system 10. The database 22 also contains a client workstation table 70 having a client ID field 72 for a client ID 73 and an IP address field 74 for an associated IP address 75. Each client ID 73 is associated with an IP address 75 in the table 70. The database 22 further contains an ASR table 90 having an ASR ID field 92 for ASR IDs 93, and an IP address field 94 for associated IP addresses 95. Each ASR ID 93 is associated with an IP address 95 in the table 90. The database 22 is configured to communicate with the ASR device 14 such that the ASR device 14 has access to the speaker-specific ASR models stored in the tables 50. The database 22 is also configured to connect to the central controller 12. The central controller 22 has access to the client workstation table 70 and the ASR device table 90. The client and ASR tables can store URLs instead of IP addresses. Resolution of the URLs into IP addresses is accomplished using standard name resolution protocols, such as DNS.

The ASR device 14 accesses the database 22 over the data network 18 for obtaining data to transcribe the stored dictation. The ASR device 14 produces a draft transcription for the dictation that originates from the client workstation 16. An example of ASR technology is the AutoScript™ product made by eScription, that also uses the speaker identifying information to access speaker-dependent ASR models with which to perform the transcription. The device 14 can transmit the draft transcription and/or intermediate results over the data network 18 to the client workstation 16 for editing/review, and to the database 22 for storage in the database 22 and to be accessed, along with the digital audio file.

Figure 4:
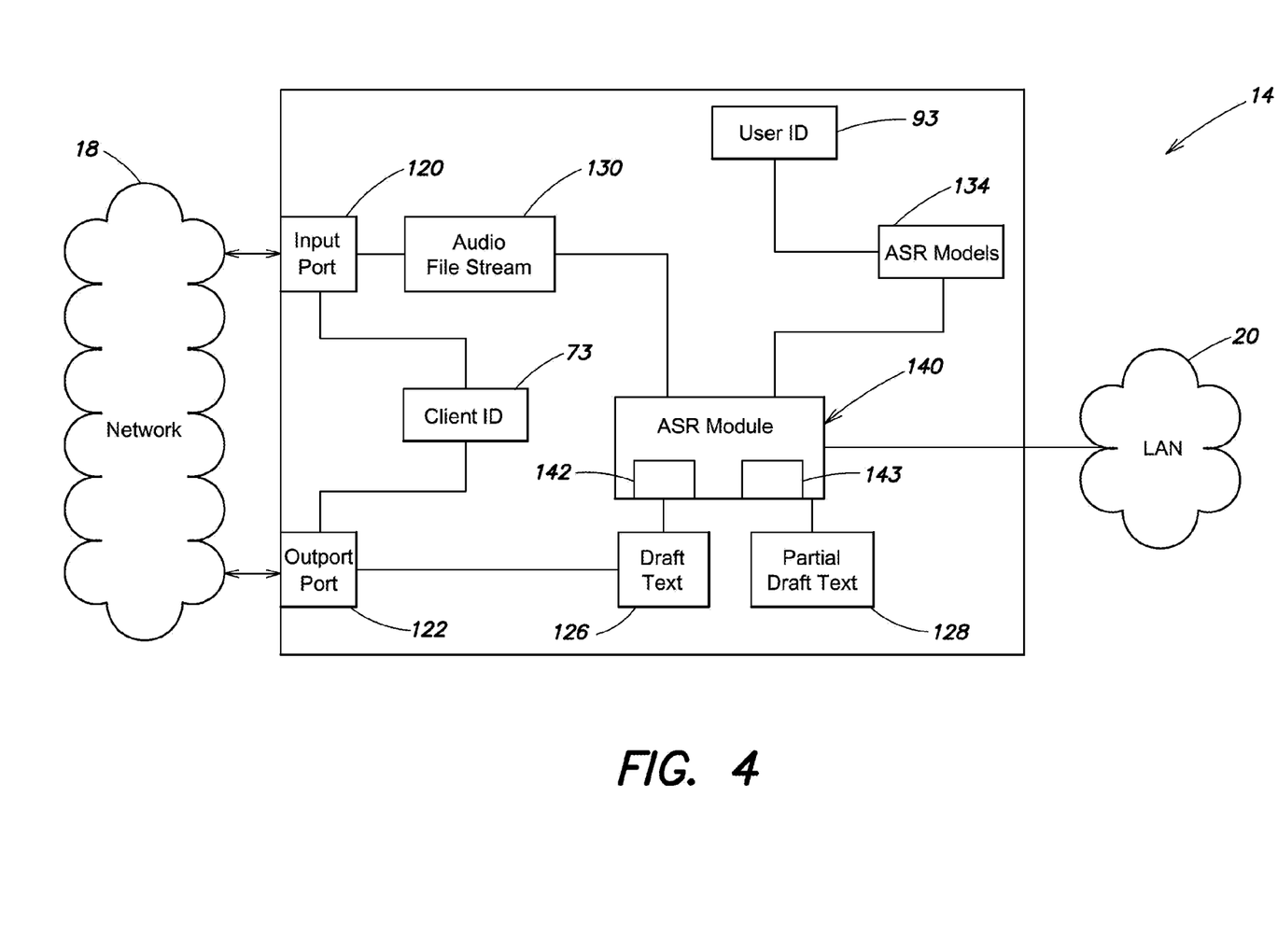
FIG. 4 is simplified diagram of an automatic speech recognition device.

Referring also to FIG. 4, the ASR device 14 includes an input port 120, an output port 122 and an ASR module 140. The ASR module 140 (e.g., software) includes a memory 142 and a processor 143 for reading software code stored in the memory 142 and/or in the ASR module 140 and for executing instructions associated with this code for performing functions described below. The ASR module 140 downloads and receives a digital audio file stream 130 originating from the client workstation 16 from the network 18. The ASR module 140 also obtains and stores information related to the dictation, such as the user ID 93, the client ID 73, etc. The ASR module 140 obtains a filepointer to the acoustic, language and formatting models that are associated with the user ID 93 from the database 22. The ASR module 140 downloads the models from the file server 24 and stores them in ASR models memory 134. Preferably, the acoustic, formatting and language models 134 are specific to the speaker 114 of the dictation. The ASR module 140 is configured to use the models 134 to create a draft transcription 126, or text file, from the audio file 130. The ASR module 140 is also configured to create a partial draft text file 128 from the audio file 130.

The ASR models 134 that are uploaded from the database 22 are speaker-specific models, such as an acoustic model, a language model, and/or a formatting models, for example. The ASR module 140 may be configured to post-process a literal transcription 126 produced by decoding the audio file using the acoustic and language models. During this post-processing, the literal text is searched for words and/or phrases corresponding to (e.g., matching) a standard trigger, for example, using a pattern-comparison technique. The ASR module 140 replaces a spoken word/phrase with corresponding standard text when the spoken words/phrases correspond to (e.g., match, or match within a threshold of confidence) a trigger. Other formatting operations are possible in this post-processing stage, such as the insertion of section-headings, formatting of numbers, and capitalization and punctuation. The entire ASR module process, including the post-processing and other formatting stages may be pipelined so that partial transcriptions may be processed by subsequent processing stages, so as to ensure real-time transcription of the audio file. The formatted text, or output draft transcription 126 is comprised in general of literal text, optionally processed by the formatting models and software, and inserted standard text. The output draft transcription 126 may be comprised entirely of one or more inserted standard texts, with all of the literal text replaced. The ASR module 140 uploads the draft transcription 126 to the client workstation 16 corresponding to the client ID 73 from the database 22. The client ID is converted to an IP address using the information stored in client workstation table 70 and the draft transcription 126 is routed to the client workstation 16 for viewing and, optionally editing or signing. In an alternative embodiment, the client workstation table 70 stores the client workstation's URL and the ASR module 140 uses standard name resolution protocols to convert this URL to an IP address for downloading the draft transcription 126 to the client workstation 16.

Figure 5:
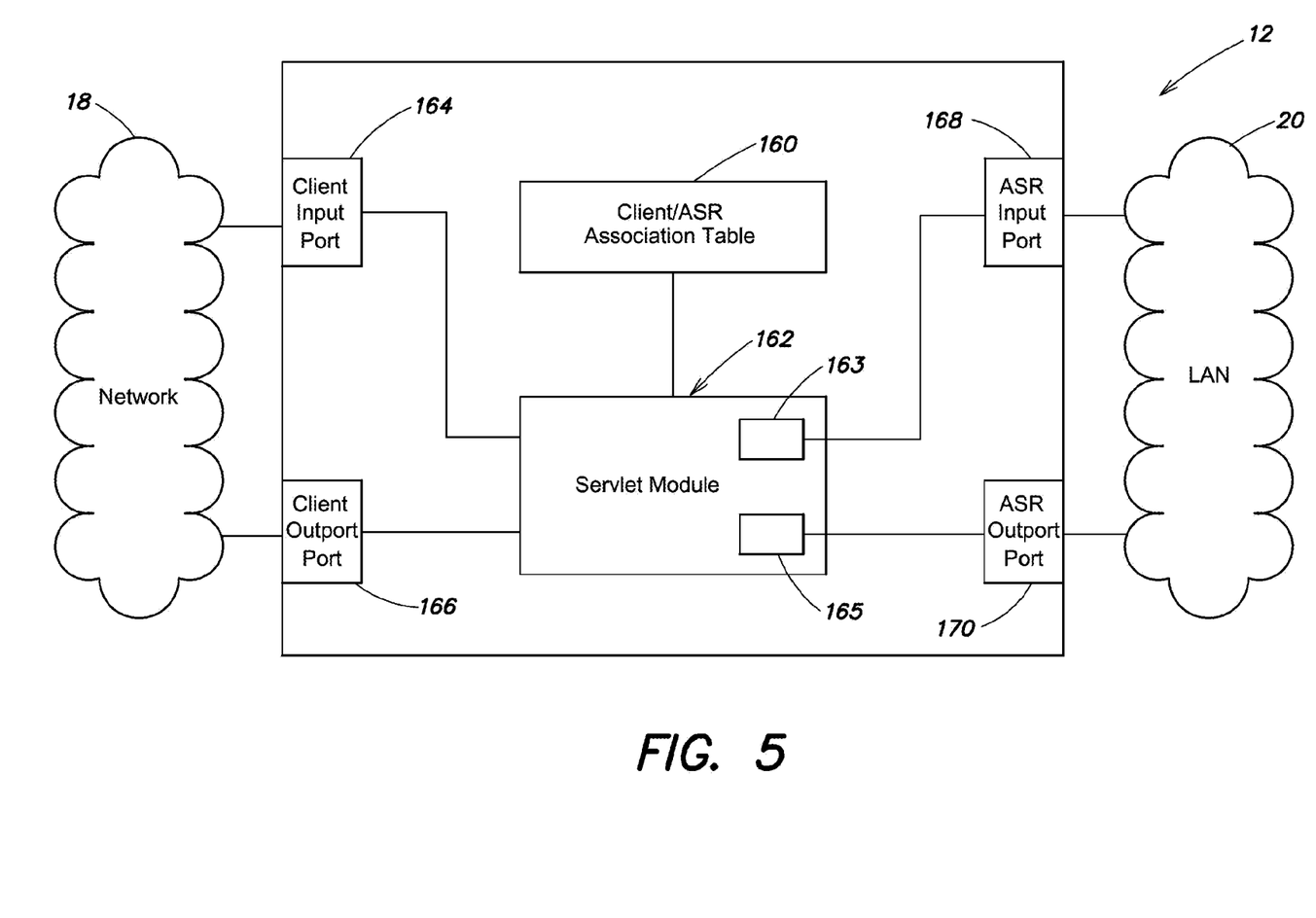
FIG. 5 is a simplified diagram of a central controller.
Figure 6:
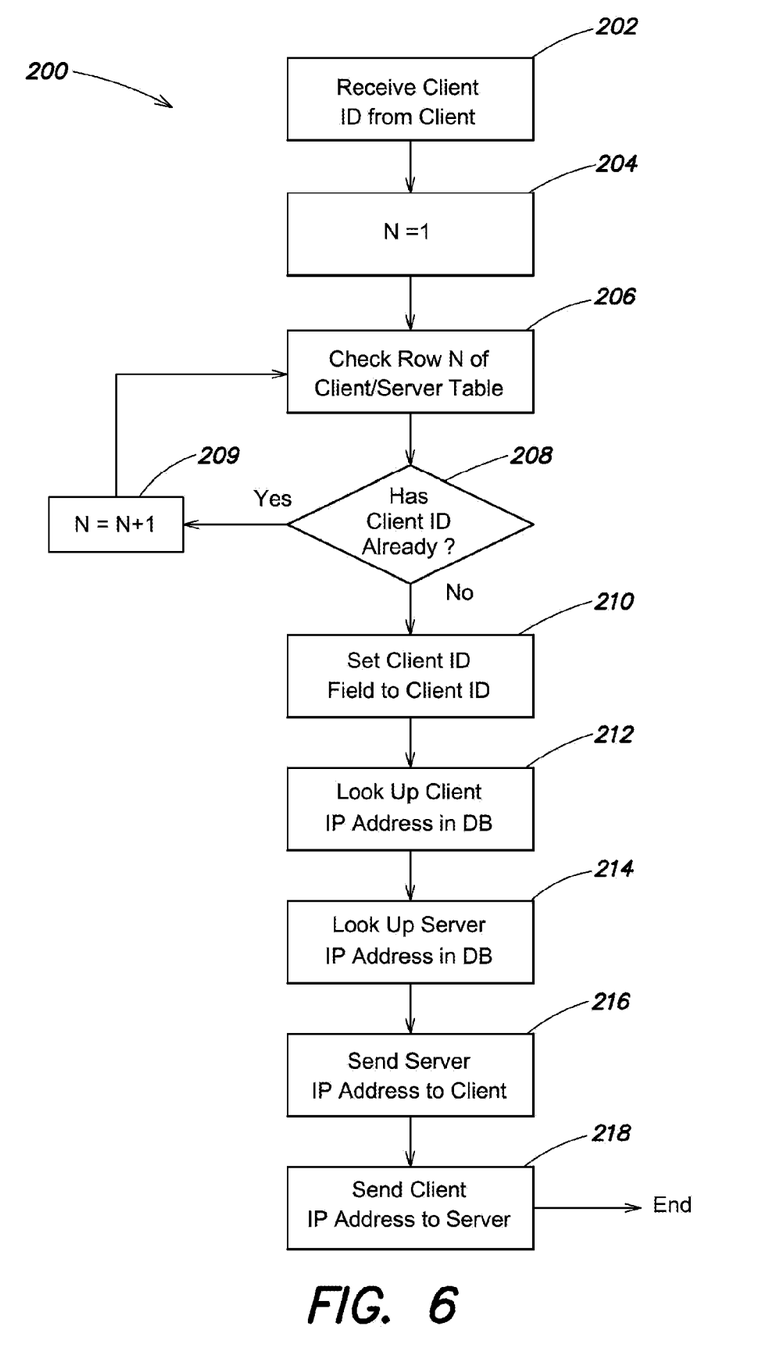
FIG. 6 is a block flow diagram of a process of accessing an automatic speech recognition device.

Referring also to FIG. 5 and FIG. 6, the central controller 12 includes a client/ASR association table 160, a servlet module 162, a client input port 164, a client output port 166, an ASR input port 168 and an ASR output port 170. The servlet module 162 (e.g., software) includes a memory 163 and a processor 165 for reading software code stored in the memory 163 and/or in the servlet module 162 and for executing instructions associated with this code for performing functions described below. The servlet module 162 is configured to receive input (e.g., audio and text files) from the client workstation 16 at the client input port 164 and store information in the client/ASR association table 160. The servlet module 160 is further configured to select an ASR device 14 to service a client at a client workstation 16. For example, the servlet module 162 consults with the existing client/ASR association table 160 to find an available ASR device 14. The servlet module 162 is configured to add an entry in the table 160 that includes the client ID 73 and the server ID 93.

The servlet module 162 of the central controller 12 is configured to identify an available ASR device 14 to which a dictation can be forwarded for processing a draft transcription according to the process 200. The process 200, however, is exemplary only and not limiting. The process 200 can be altered, e.g., by having stages added, removed, or rearranged.

The servlet module 162 is configured to receive a client ID 73 from a client workstation 16, stage 202. The servlet module 162 associates the client ID with an ASR device 14 (e.g., "N=1"), stage 204. The servlet module 162 is configured to check row N of the client/ASR table 160, which represents a specific ASR device 14, to determine whether that ASR device 145 is available for a client ID 73. At decision block 208, if the servlet module 162 determines that the ASR device at row N of table 160 is not available, the servlet module 162 checks row N+1 for availability. When an ASR device 14 has been identified as an available device, the servlet module 162 sets the client ID field of the table 160 to the client ID 73, stage 210. At stage 212, the servlet module 162 is configured to look up the client IP address 75 from the table 70 in the database 22. At stage 214, the servlet module 162 is configured to look up the server IP address 95 in the table 90 of the database 22. The servlet module 162 is further configured to send the server IP address 95 to the client workstation 16, stage 216, and send the client IP address 75 to the ASR device 14, stage 218. The client 16 and the ASR device 14 are in communication upon completion of the servlet process 200. Thus, a specific ASR device 14 is paired with a client workstation 16 for the completion of a dictation, or a portion of a dictation. In another embodiment, the client workstation and ASR device tables (70, 90) in the database 22 store URLs corresponding to the client ID and ASR device. The servlet module 162 is configured to send the ASR device URL to the client workstation 16 and to send the client workstation URL to the ASR device 14. The client workstation and ASR device then route files (e.g. Audio and text files) using these URLs which are translated to IP addresses inside the network 18, using standard name resolution protocols such as DNS.

Figure 7:
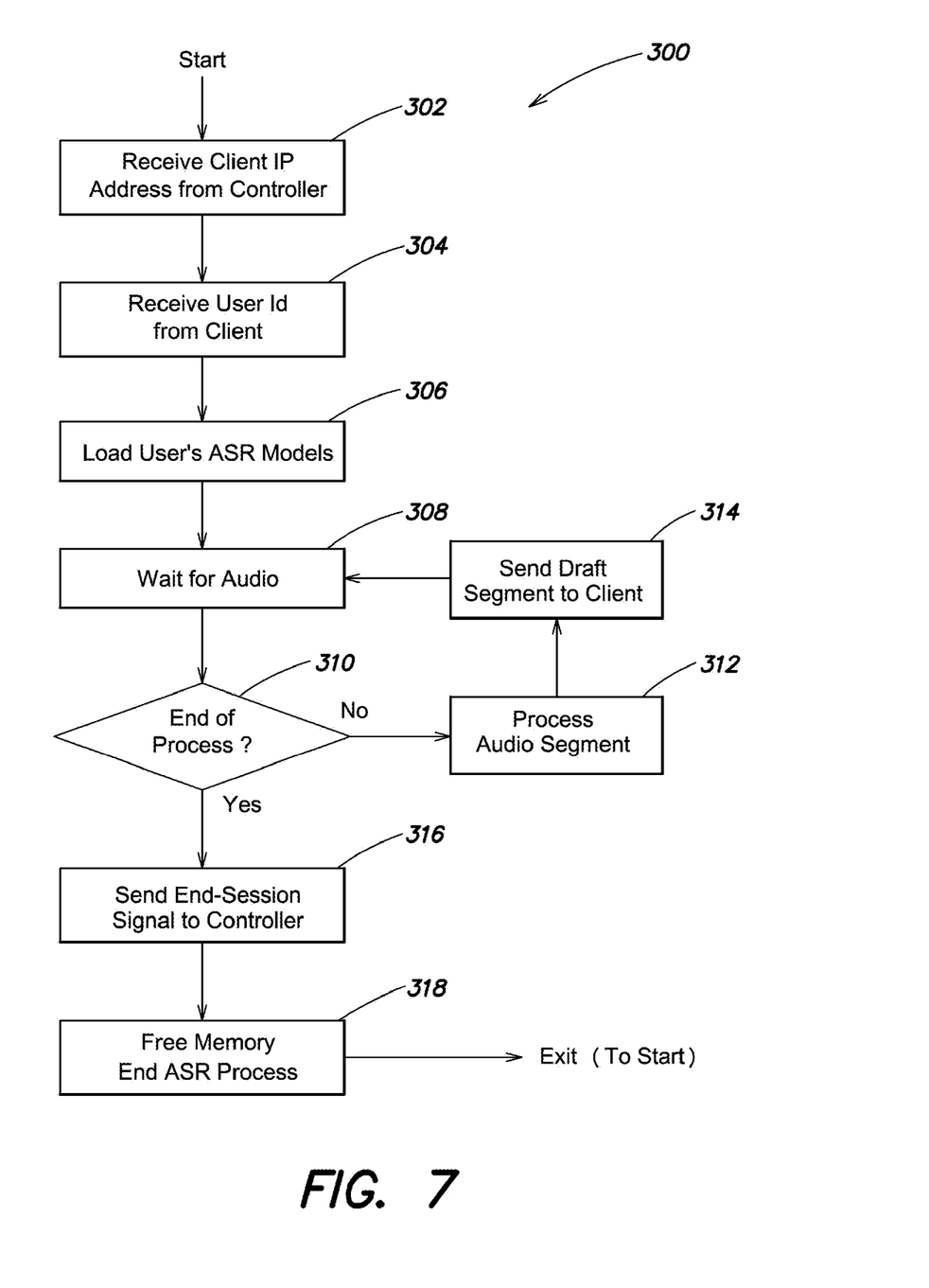
FIG. 7 is a block flow diagram of a process of automatic speech recognition in the ASR device.

Referring also to FIG. 7, the ASR device 14 is configured to receive an input of data and output a draft transcription to the client, process 300. The process 300, however, is exemplary only and not limiting. The process 300 can be altered, e.g., by having stages added, removed, or rearranged. The process 300 is preferably performed for each occurrence of sign-in of a client from the servlet module 162.

At stage 302, the ASR device 14 receives a client IP address 75 from the central controller 12. At stage 304, the ASR device 14 receives a user ID 53 from the client at the client workstation 16. Each of the client IP address 75 and the user ID 53 are stored in the database 22, from which the central controller 12 can obtain the respective addresses and IDs. At stage 306, the ASR device 14 loads the ASR models 134 associated with the user ID 53. The ASR device 14 receives the audio feed 130 from the client workstation 16, stage 308, and processes a draft text document 126 using the models 134. At decision block 310, the ASR device 14 determines whether the audio session from the audio file stream 130 is complete. If not, the ASR device processes the completed audio segment, stage 312, and stores a partial draft text 128. The ASR device 14 sends the segment, or partial draft text 128 to the client at the client workstation 16. The ASR device 14 returns to stage 308 to await receipt of additional audio stream 130. If, at decision block 310, the ASR device 14 determines that the audio session has ended, the ASR device 14 sends a signal to the central controller 12 to indicate the end of the session, stage 316. At stage 318, the memory space used in process 300 is made available for a next ASR process from a next client workstation 16.

Figure 8:
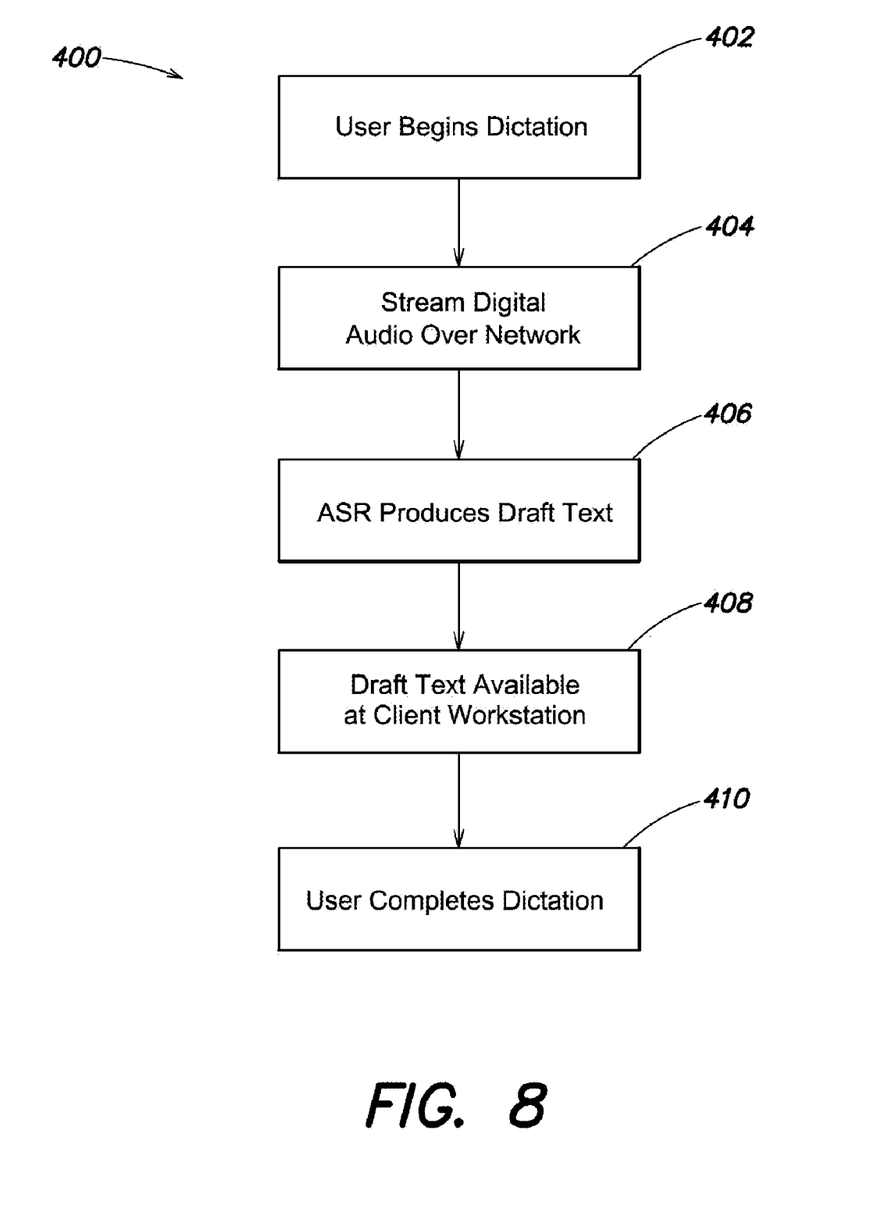
FIG. 8 is a block flow diagram of a process of creating a formatted document in real-time.

Referring to FIG. 8, with further reference to FIGS. 1-5, a process 400 for creating a formatted draft document in real-time is described. The process 400, however, is exemplary only and not limiting. The process 400 can be altered, e.g., by having stages added, removed, or rearranged.

At stage 402, a clinician or other user dictates into the dictating device 102 at the client workstation 16. For example, the speaker 114 may dictate into the microphone 110. The dictating device 102 records the audio and the audio is digitized by the A/D converter 112. The digital audio is routed to a network port on the client workstation 16.

At stage 404, the client workstation 16 streams digital audio out over the network 18. The digital audio is sent to the ASR device 14. The streaming of the audio is time-quantized, preferably using standard packet-based transmission protocols such as TCP/IP, HTTP, UDP or RPC, for example. The ASR device 14 receives the digital audio from the network 18 at the input port 120. The audio file stream 130 is routed to the ASR module 140. The audio streaming protocol can incorporate known techniques that improve transmission, such as acknowledging packets, requesting re-sends, maintaining a packet index with each packet such that out-of-order re-sends can be reconstructed at the ASR device 14, for example.

At stage 406, the ASR module 140 uses the models to produce draft text. Generally, the draft text is produced incrementally from the audio file stream 130. Typically, there is some latency between the receipt of a portion of the audio file and production of the resulting output draft text 126 in the range of, for example, a few hundred milliseconds. The dictation is associated with a user ID, an indication of which is stored, in association with the dictation, in the database 22. The audio is also stored at the client dictating device 102 for playback by the user at the client workstation 16. In a circumstance where the network 18 is temporarily unavailable, the stored audio is routed to the background ASR system.

At stage 408, the draft text 126 is completed and available incrementally. The draft text 126 can be available as partial draft text segments 128. The partial draft text segments 128 (or the draft text 126) are output to the network 18 via the output port 122 of the ASR device 14. The draft text 126 is streamed over the network 18 from the ASR device 14 to the client workstation 16. The draft text 126 appears on the display screen 104 of the dictation station 100. The draft text 126 can be streamed to the workstation 16 as a token alignment file (containing indices into the audio file, confidence information, coloring or other text formatting information, playback speed information or playback skipping information), for example, or in other formats such that indices into the audio file are maintained to facilitate editing functionality. The text streaming protocol can incorporate known techniques that improve transmission of the text stream. Further, the text stream can be buffered on the ASR device 14. The ASR device 14 can await a signal for all available draft text to be sent back to the client 16, e.g., when the clinician indicates that dictation has been completed.

At stage 410, the clinician 114 completes dictating and optionally edits the draft text 126. Preferably, the clinician 114 edits the draft text 126 on the display screen 104, either incrementally or in batch at the completion of the dictation process. The clinician 114 can sign the document via the editing/signing device 106. The edited document may be entered into a medical record system, or other storage system at the client sight.

The clinician can send a signal to the ASR device 14 indicating that dictation has been completed. For example, the signal can be an endpoint detector running on the client workstation 16 (i.e., part of the audio recording process) based on signal amplitude being below a certain threshold for a certain time period. Alternatively, the signal that dictation has been completed may include a time duration in which the ASR device 14 has not recognized any word. The indication can be an explicit indication from the clinician that dictation has ended (e.g., by pressing a button on the recording device). A signal can be sent to the ASR device 14 when the clinician has completed a portion of the audio, such that the resulting draft text 126 can be appended to when the dictation begins again.

Figure 9:
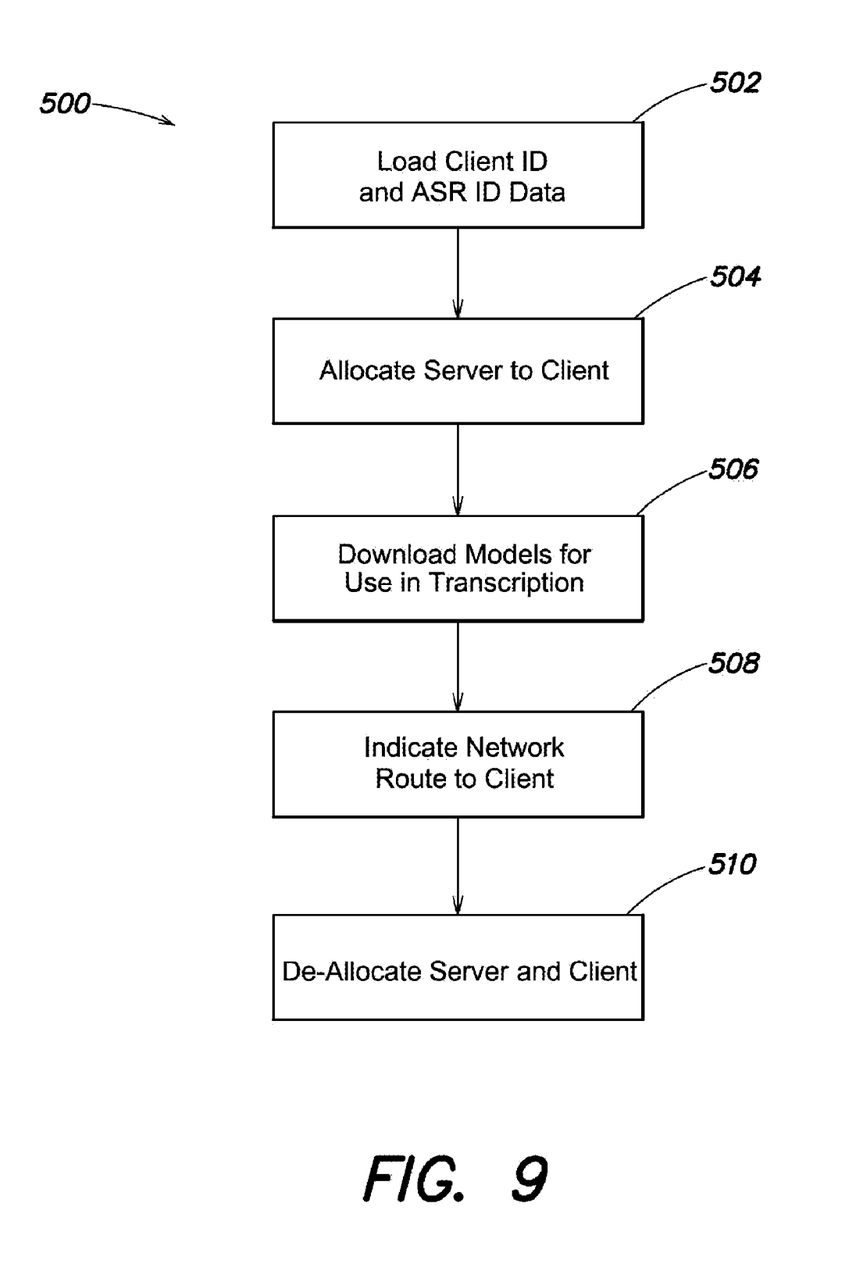
FIG. 9 is a block flow diagram of a process of allocating a server to a client device for real-time transcription.

Referring to FIG. 9, with further reference to FIGS. 1-5, a process 500 for allocating the ASR devices 14 to clients 16 is described. The process 500, however, is exemplary only and not limiting. The process 500 can be altered, e.g., by having stages added, removed, or rearranged.

At stage 502, the servlet module 162 of the central controller 12 initializes by loading the client/ASR association table 160, which lists the IP address of each client workstation 16 and each ASR device 14. The servlet module 162 also initializes an empty client/ASR association table in a memory of the module 162. The table 163 includes fields for a client ID 73

(e.g., a client IP address), a server ID 93 (e.g., a server IP address) and a user ID 53. Generally, there are a number of ASR devices 14 connected over the network 18 to the central controller 12 that are prepared to service jobs coming into the servlet module 162. The ASR devices 14 are also in communication with the database 22. The database 22 and/or the file server 24 store ASR models for speakers that have access to the system 10.

At stage 504, a user logs into a dictating device 100 at a client workstation 16. Preferably, a user logs in by entering a user ID and a password or other code. A signal is sent from the client workstation 16 to the central controller 12 to allocate an ASR device 14 from the available ASR devices 14 connected to the system 10. The servlet module 162 identifies an available ASR device 14 to which a dictation can be forwarded for processing a draft transcription (see FIG. 6 and accompanying text). The servlet module 162 allocates the first ASR device 14 that does not have an entry in its client/ASR association table 160. The servlet module 162 adds an entry to the table 160 associating the client and the ASR device, as well as the user ID of the speaker. The servlet module 162 sends a signal to the selected ASR device 14 to initialize an ASR process for the user ID.

At stage 506, the ASR device 14 locates the speaker-specific models 134 for the clinician indicated by the user ID 53 (see FIG. 7 and accompanying text). The ASR module 140 accesses and downloads the models 134 from the database 22. Once the models 134 are loaded on the ASR module 140, the ASR device 14 awaits the audio feed from the client workstation 16. The servlet module 162 maintains continuous contact with the client 16 and each of the ASR devices 14 that are connected to the system 10 throughout the session, choosing the most available ASR device 14 for each segment of audio 130. For example, the servlet module 162 may receive a signal from each ASR device 14 that indicates how much audio remains to be processed. The servlet module 162 uses the information from the ASR device 14 to inform the client 16 where to send the next packet of audio.

In an alternative embodiment, an ASR device is pre-assigned to a particular user. The servlet module 162 learns from the database 22 the population of users of the system 10 and pre-assigns ASR devices 14 to users. In this embodiment, models 134 are loaded initially into the ASR module 140.

At stage 508, the servlet module 162 sends a signal to the client 16 indicating the network route (e.g., IP address or URL) to the allocated ASR device 14. The client begins dictation at the client workstation 16 (see FIG. 8 and accompanying text). The client completes the dictation process and logs out of the system 10 at completion. At stage 510, the servlet module 162 receives a signal from the client workstation 16. At stage 510, the servlet module 162 de-allocates the ASR device 14, and the entry associating the client and the ASR device in the table 160 is removed. The ASR device 14 is sent a signal over the network 18 to end the process of waiting for the audio feed 130. The ASR device 14 is cleared of the ASR models 134 that were downloaded from the database 22.

In an alternative embodiment, the client workstations 16 initialize by loading the ASR device table 90 from the database 22 into memory. In this embodiment, the ASR device table 90 contains, for each ASR device a user ID as well as a route (e.g., an IP address or URL) to the ASR device. The ASR devices 14 are initialized by loading the appropriate ASR models for the user ID into ASR models memory 134. When a user signs in to a client workstation 16, the appropriate ASR device 14 is selected from the ASR device table 90 and the client workstation 16 stores the network route to the ASR device in its internal memory. The client workstation 16 then uses this route (e.g., an IP address or URL) to send its own URL to the ASR device 14 for storage in the ASR device's memory. All subsequent communication between the client workstation 16 and the ASR device 14 uses standard network communication and address resolution protocols. In this embodiment, the central controller 12 is not needed. When the user's dictating session is done, the client workstation 16 deletes the selected ASR device network route from its memory, until this memory is again filled when a new user (or the same user) signs in at a later time.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

As the ASR device 14 processes more audio from the client workstation 16 (i.e., gets further into the dictation), the ASR device may refine the draft contents from an earlier portion of the audio. For example, the ASR device 14 may refine the draft text that has already been sent to the client workstation 16 for display on the screen. Refinement can involve, for example, real-time adaptation of an ASR model 134 (e.g., acoustic, language or formatting models), or by using new evidence to refine a previous estimated text output. For example, the formatting model may have assumed that, at an earlier point, when the clinician dictated the word "exam", it was the beginning of the physical examination section, and therefore the draft should include the following text:

Physical Examination:

However, at a later point the clinician dictates "physical exam", and the formatting model deems it more likely that this is when the section begins. The ASR module 140 can go back to the previous formatting decision and replace the section-heading with the normally formatted word "exam". The ASR device 14 can include in its memory a history of the entire draft for the dictation since the clinician began dictating. When the output draft text is modified, the entire new draft text is transmitted to the client, along with an indicator (e.g., sent as part of the file stream containing the draft text) that the entire document which appears on the screen is to be replaced by the new draft. The editing/signing device on the client workstation 16 can display the new draft text based on first having received the indicator as part of the data stream. Alternatively, the ASR device can send only the piece of the draft text which has changed as a result of a refinement process. The final stream may contain token indices into the pre-existing draft text (or wal file) to indicate precisely which portion of the text on the editing/signing device to replace and redisplay. An explicit end-of-dictation indicator which goes from the user through the client workstation 16 to the ASR device 14, at which point draft text history is cleared.

If during the process, the clinician indicates that they do not want to edit the draft, so that the current audio and any audio created before the end of the dictation, along with the current draft text and any text produced from the rest of the dictation, goes into the background ASR system, to be edited by a medical transcriptionist, and made available to the medical record system and clinician (for reading and, optionally, signing) at a later time. The remaining draft text may continue to appear on the display screen at the client workstation 16. Alternatively, the audio is reprocessed using a fully-background ASR device (which could be the same as the real-time ASR device, with different parameter settings) so that a new draft is presented for off-line editing by the medical transcriptionist.

In the process of allocating a server to a particular client, where multiple servers are available for each client, audio segments can be labeled as to order such that sections of the draft text are correctly ordered at the client when the audio has been processed. The servlet module 162 can control the routing of all audio and text packets individually. In this embodiment, clients 16 and ASR devices 14 connect only to the servlet module 162 and the servlet module 162 makes routing decisions based on the internal client/ASR association table 160. ASR devices 14 may also be made available for background ASR of dictations from the same or a different set of users. The same ASR models 134 can be used for the same users. Alternatively, the models 134 used for the background speech recognition process may differ from the models used in the real-time speech recognition process, possibly with improved accuracy but longer processing times. In some embodiments, the central controller 12 is not necessary for the operation of the system 10. For example, the routes to each ASR device 14 can be stored at every client workstation 16, and the client can give its return IP address to the ASR device 14 such that a central controller 12 is no longer needed by the system 10. In embodiments of the invention, IP address resolution—both for the route from the client to the ASR device, and the route from the ASR device to the client—can be done using standard internet protocols (such as DNS). The client stores the hostnames of the ASR devices and sends its hostname for the return address, and the IP addresses are allocated dynamically.

While the description above focused on medical transcriptions, the invention is not limited to medical transcriptions. The invention may be applied to formatting dictations for non-medical applications such as legal dictations, psychological evaluations, etc. Further, while the discussion above refers to "the invention," more than one invention may be disclosed.

What is claimed is:

1. A computer program product for transcribing a medical dictation in real-time, the computer program product residing on a computer-readable medium and comprising computer-readable instructions for causing a computer to:
    obtain a user identification from a client via a computer network, the user identification being associated with and indicative of a speaker that provides the medical dictation concerning a patient;
    load models associated with the user identification, the models being configured for use in recognizing words in the medical dictation to develop a draft transcription of the dictation;
    receive an audio feed of the dictation from the client;
    process the audio feed using the models in real-time to create a segment of the draft transcription of the dictation; and
    transmit the segment of the draft transcription to the client in real-time relative to the audio feed.

2. The computer program product of claim 1 further comprising instructions for causing the computer to establish a connection with the client based on an availability of the computer to process the audio feed from the client.

3. The computer program product of claim 1 wherein the instructions for causing the computer to process the audio feed to create the draft transcription of the dictation are configured to cause the computer to:
    create the draft transcription of a completed dictation; and
    transmit the draft transcription of the completed dictation to the client.

4. The computer program product of claim 1 wherein the instructions for causing the computer to transmit the segment of the draft transcription to the client are configured to cause the computer to transmit the segment of the draft transcription for real-time review at the client.

5. The computer program product of claim 1 further comprising instructions for causing the computer to store the segment of the draft transcription in association with the audio feed.

6. The computer program product of claim 1 further comprising instructions for causing the computer to store all segments of the draft transcription in association with the audio feed.

7. The computer program product of claim 1 further comprising instructions for causing the computer to:
    complete the process of creating the segment of the draft transcription; determine presence of a second segment of the audio feed of the dictation from the client;
    process the second segment of the audio feed using the models to create a second segment of the draft transcription of the dictation; and
    transmit the second segment of the draft transcription to the client.

8. The computer program product of claim 1 further comprising instructions for causing the computer to receive a sign-out signal from the client upon completion of the dictation.

9. A method of processing a medical record transcription, the method comprising:
    obtaining a user identification from a client via a computer network, the user identification being associated with medical personnel that provides a dictation concerning a patient;
    loading models associated with the user identification, the models being configured to assist in developing a draft transcription of the dictation;
    receiving an audio feed of the dictation from the client;
    processing the audio feed using the models to create the draft transcription of the dictation; and
    transmitting the draft transcription to the client in real-time relative to the received audio feed.

10. The method of claim 9 further comprising establishing a connection with the client based on a client identification.

11. The method of claim 9 wherein the processing further comprises processing a segment of the audio feed to create a draft transcription of the segment of the audio feed.

12. The method of claim 9 wherein the transmitting further comprises transmitting a segment of the draft transcription to the client.

13. The method of claim 9 further comprising:
    refining the draft transcription sent to the client; and transmitting the refined draft transcription to the client.

14. A method of allocating a medical dictation to a server for transcription, the method comprising:
    receiving an identification from a client via a computer network for processing a medical dictation over a network;

selecting an available processor from a plurality of processors in communication over the network;
sending an identification associated with the available processor to the client; and
establishing a link between the client and the available processor such that data is transmitted from the client to the available processor for processing the medical dictation to create a draft transcription of the dictation in real-time.

* * * * *